G. E. DE VORE.
FOLDING BOX SEAT.
APPLICATION FILED DEC. 16, 1908.

924,148.

Patented June 8, 1909.

WITNESSES:

INVENTOR
GEORGE E. DE VORE
BY
ATTORNEYS

UNITED STATES PATENT OFFICE.

GEORGE E. DE VORE, OF LANSING, MICHIGAN.

FOLDING BOX-SEAT.

No. 924,148.     Specification of Letters Patent.     Patented June 8, 1909.

Application filed December 16, 1908. Serial No. 467,836.

*To all whom it may concern:*

Be it known that I, GEORGE E. DE VORE, a citizen of the United States of America, residing at Lansing, in the county of Ingham and State of Michigan, have invented certain new and useful Improvements in Folding Box-Seats, of which the following is a specification, reference being had therein to the accompanying drawings.

This invention relates to a folding seat particularly designed for automobiles and the object of the invention is to provide a seat, preferably an emergency seat, which is adapted to serve as a trunk.

To this end the invention consists in a folding box seat having a back, arm rests and seat proper which can be conveniently folded within the top of the box all in the manner more fully described hereinafter and shown in the accompanying drawings, in which:—

Figure 1:
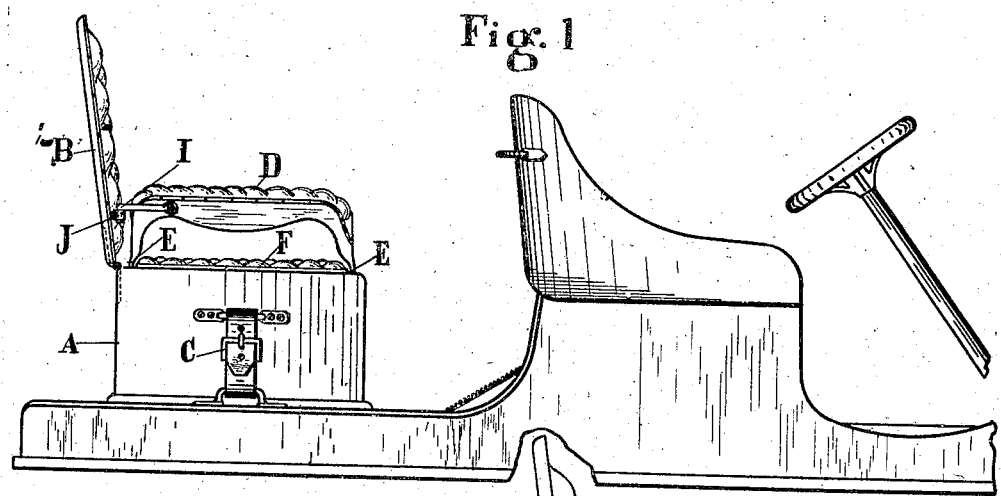
Figure 2:
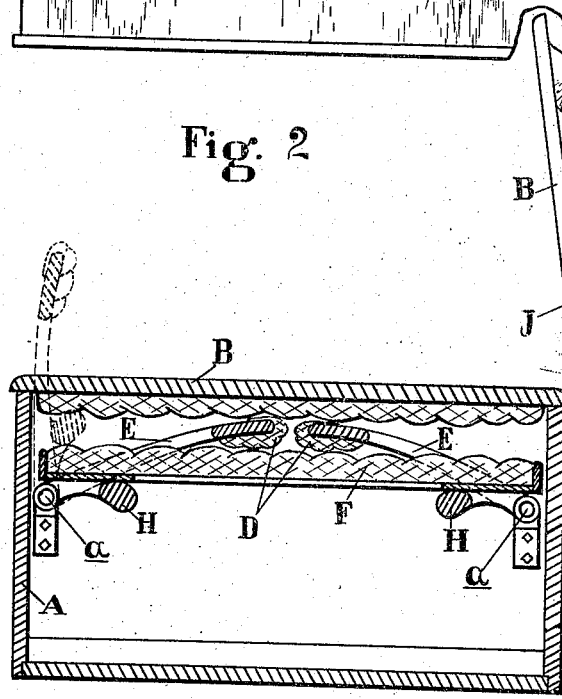
Figure 3:
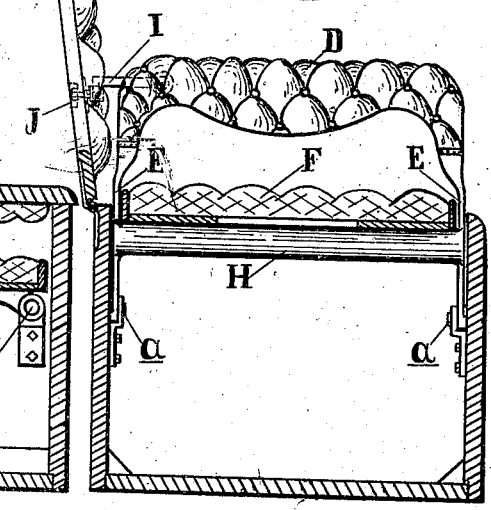

Figure 1 is an end elevation showing the seat as in use upon an automobile body. Fig. 2 is a detached longitudinal vertical section, the seat being folded, and Fig. 3 is a cross section of Fig. 1.

A is the seat frame in the form of a box having sides, ends and bottom.

B is the back of the seat hinged to the top of the frame and adapted to be folded down and form the cover of the box.

C are straps or other means for detachably securing the seat upon the deck or frame of the automobile body in rear of the front seat.

D are arm rests having supporting arms E which project down into the box and are hinged thereto at *a* in such manner that they are adapted to be folded in the longitudinal direction of the box as shown in Fig. 2.

F is the seat proper, it is of a size to fit the inside of the box loosely and it is vertically movably supported in position therein by means of two cross-bars H which unite the supporting arms of the arm rests near their pivotal connection. Each arm rest with its supporting arms and the uniting cross-bar thus forms a swinging supporting frame adapted to be folded longitudinally within the upper portion of the box in such manner that the seat is raised and lowered by raising and lowering these frames.

As shown in Fig. 3 the bottom of the seat in its raised position is a little below the upper edges of the box, it is therefore held against accidental displacement without being in any way connected to any other part and when the parts are folded down as in Fig. 2, the seat is withdrawn below the cover and held fast between the cross bars H and arm rests D. Therefore with a suitable lock provided for the cover and the parts being folded upon each other and held fast there can be no rattling.

The back B may be held in position when in use as the back in any known manner, a simple and preferable way being by means of hooks I pivotally secured to the arm rests and engaging with staples J secured to the back as shown in the drawings.

A box seat thus constructed forms a desirable equipment for automobiles, as it provides all the conveniences of a large trunk for the safe storage of automobile accessories traveling outfit and other articles desired to be carried on automobile trips, its construction is simple and substantial and there is no rattling when folded or unfolded. With suitable upholstering it can fill all the requirements for a comfortable riding seat. It is obvious that my seat may be found desirable for a front seat as in commercial vehicles or for other uses.

What I claim as my invention is:—

1. In a folding seat the combination of a box frame having a hinged cover adapted to form a back of the seat, a seat proper within the box frame and two supporting frames at the opposite ends of the box frame vertically movably supporting the seat therein, each supporting frame comprising an arm rest having arms extending into the box frame and having hinge connections therewith adapting each frame to be folded longitudinally within the box into the space below the cover, the arms being provided near their hinged ends with supporting means for the seat adapted to raise and lower the seat proper by the actuation of the frames.

2. In a folding seat, the combination of a box frame having a hinged cover adapted to form the back of the seat, a seat proper within the box frame and two supporting frames at the opposite ends of the box frame vertically movably supporting the seat therein, each supporting frame comprising an arm rest having arms projecting downwardly into the box frame and having hinge connection therewith adapting each frame to be folded longitudinally into the box, cross bars uniting the arms of the frames near their hinged ends and adapted to raise and lower the seat by the actuation of the frames and hooks on the arm rests adapted to engage the cover and hold it in position when serving as a back.

In testimony whereof I affix my signature in presence of two witnesses.

GEORGE E. DE VORE.

Witnesses:
C. A. SECORD,
O. D. HARDY.